US012473669B2

(12) United States Patent
Limozin et al.

(10) Patent No.: US 12,473,669 B2
(45) Date of Patent: Nov. 18, 2025

(54) CONFORMABLE PANEL COMPRISING TWO FACES LINKED BY A UNIFORM CONNECTING STRUCTURE

(71) Applicant: COMPAGNIE GENERALE DES ETABLISSEMENTS MICHELIN, Clermont-Ferrand (FR)

(72) Inventors: Bastien Limozin, Clermont-Ferrand (FR); Christophe Le Clerc, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 18/571,969

(22) PCT Filed: Jun. 23, 2022

(86) PCT No.: PCT/FR2022/051231
§ 371 (c)(1),
(2) Date: Dec. 19, 2023

(87) PCT Pub. No.: WO2022/269200
PCT Pub. Date: Dec. 29, 2022

(65) Prior Publication Data
US 2024/0309564 A1    Sep. 19, 2024

(30) Foreign Application Priority Data

Jun. 24, 2021    (FR) ........................................ 2106778

(51) Int. Cl.
*D03D 11/02*    (2006.01)
*D03D 7/00*    (2006.01)
*D03D 13/00*    (2006.01)

(52) U.S. Cl.
CPC ............... *D03D 11/02* (2013.01); *D03D 7/00* (2013.01); *D10B 2401/061* (2013.01);
(Continued)

(58) Field of Classification Search
CPC .... D03D 11/02; D03D 7/00; D10B 2401/061; D10B 2403/021; D10B 2505/02; D10B 2505/12; D10B 2505/20; D10B 2401/06
See application file for complete search history.

(56) References Cited

U.S. PATENT DOCUMENTS 4,304,748 A * 12/1981 Takahashi ............... A44B 19/42
425/814
4,853,269 A    8/1989 Fukumori et al.
(Continued)

FOREIGN PATENT DOCUMENTS

DE    2855194 A1    6/1980
DE    4428238 A1    2/1996
(Continued)

OTHER PUBLICATIONS

International Search Report dated Oct. 4, 2022, in corresponding PCT/FR2022/051231 (4 pages).

*Primary Examiner* — Robert H Muromoto, Jr.
(74) *Attorney, Agent, or Firm* — VENABLE LLP

(57) ABSTRACT

A panel includes a first woven fabric, a second woven fabric, and a linking structure comprising stays linking the first woven fabric to the second woven fabric, each stay having an at-rest length that is substantially equal to the mean of the at-rest lengths of the stays, and the first woven fabric being plastically deformable in at least one of its main directions.

15 Claims, 2 Drawing Sheets

(52) U.S. Cl.
CPC .... *D10B 2403/021* (2013.01); *D10B 2505/02* (2013.01); *D10B 2505/12* (2013.01); *D10B 2505/20* (2013.01)

(56) References Cited

U.S. PATENT DOCUMENTS

| | | | |
|---|---|---|---|
| 8,783,448 B2* | 7/2014 | Shoji | D04B 1/123 |
| | | | 198/846 |
| 9,617,077 B2* | 4/2017 | Shoji | F16G 1/04 |
| 11,046,112 B2 | 6/2021 | Rigo et al. | |
| 11,191,634 B2* | 12/2021 | Spindler | A61F 2/89 |
| 11,325,418 B2 | 5/2022 | Rigo et al. | |
| 11,331,953 B2 | 5/2022 | Rigo et al. | |
| 11,939,708 B2 | 3/2024 | Sun et al. | |
| 12,036,829 B2 | 7/2024 | Brousseau et al. | |
| 2003/0069532 A1* | 4/2003 | Mowry | A61F 2/06 |
| | | | 623/1.1 |
| 2003/0106346 A1 | 6/2003 | Matsumoto | |
| 2007/0151655 A1 | 7/2007 | Keller et al. | |
| 2010/0233417 A1 | 9/2010 | Brewin et al. | |
| 2017/0044766 A1 | 2/2017 | Hilgenbrink | |
| 2019/0366772 A1 | 12/2019 | Rigo et al. | |
| 2020/0171782 A1 | 6/2020 | Porcheret et al. | |
| 2020/0254819 A1 | 8/2020 | Cornille et al. | |
| 2021/0115600 A1 | 4/2021 | Sun et al. | |
| 2022/0080775 A1 | 3/2022 | Limozin et al. | |
| 2022/0410625 A1 | 12/2022 | Guillaumain et al. | |
| 2024/0279927 A1* | 8/2024 | Limozin | D03D 1/00 |
| 2024/0287798 A1 | 8/2024 | Limozin et al. | |

FOREIGN PATENT DOCUMENTS

| | | |
|---|---|---|
| DE | 102018213742 A1 | 2/2020 |
| EP | 1059159 B1 | 5/2004 |
| EP | 2408957 B1 | 4/2017 |
| WO | 2010/107376 A1 | 9/2010 |
| WO | 2015/053842 A1 | 4/2015 |
| WO | 2015/187826 A2 | 12/2015 |
| WO | 2018/130782 A1 | 7/2018 |
| WO | 2018/130783 A1 | 7/2018 |
| WO | 2019/197319 A1 | 10/2019 |
| WO | 2021/005305 A1 | 1/2021 |
| WO | 2021/074538 A1 | 4/2021 |

* cited by examiner

[Fig.1]
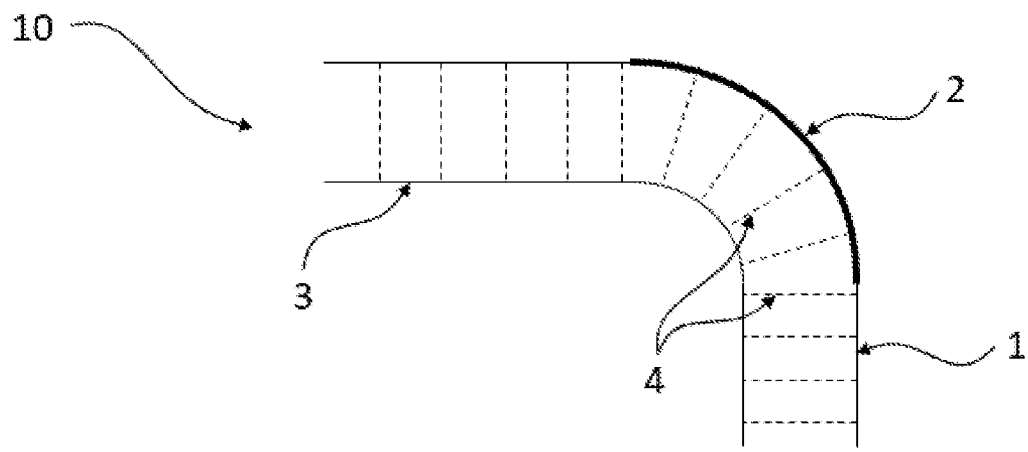
[Fig.2]
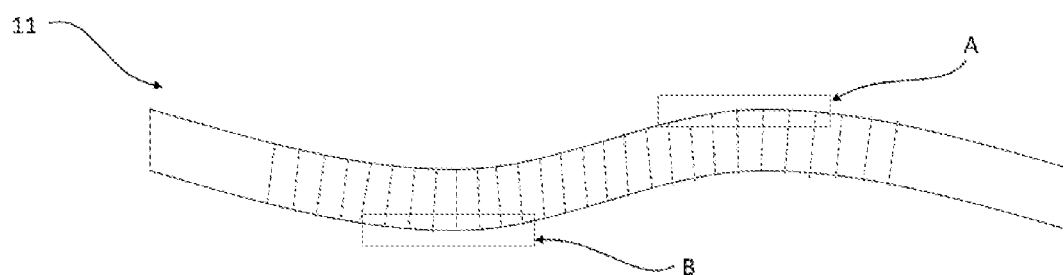
[Fig 3]
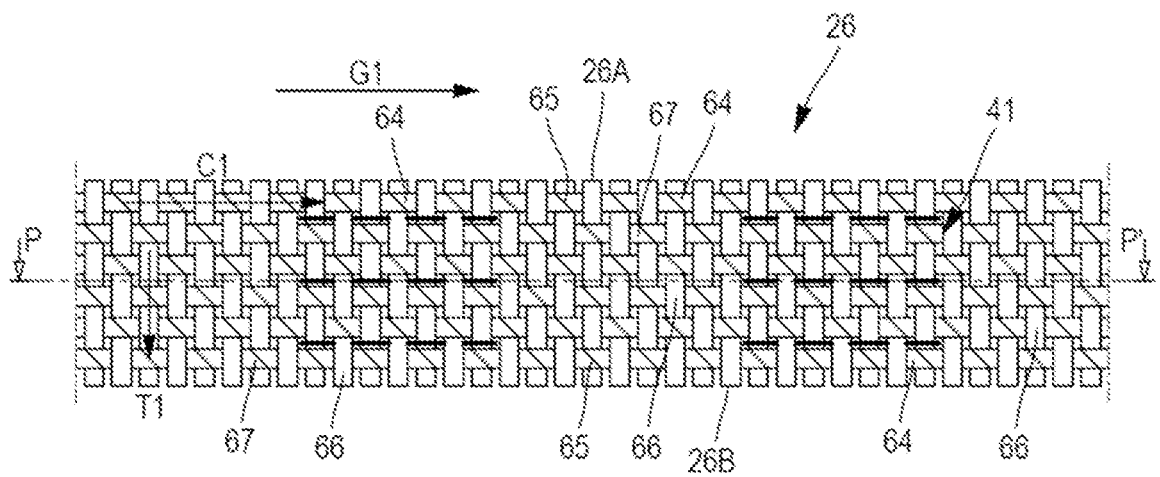

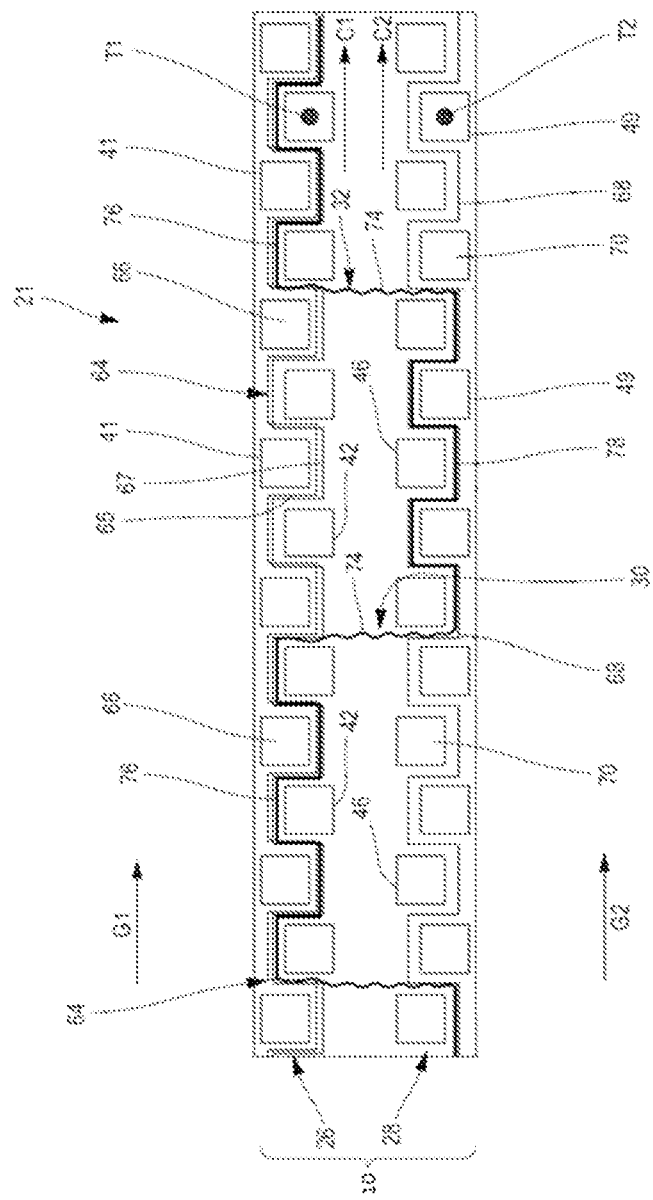

CONFORMABLE PANEL COMPRISING TWO FACES LINKED BY A UNIFORM CONNECTING STRUCTURE

TECHNICAL FIELD OF THE INVENTION

The invention relates to a panel comprising two woven fabrics linked by a load-bearing structure and to the use of such panels as building materials.

PRIOR ART

Numerous panels are used in the building industry. Included among these, mention may be made of structural panels such as concrete panels or plasterboard panels, or else insulating panels such as, for example, polyurethane, rockwool or wood-fibre panels.

These panels may be made from a single type of material, for example plaster, and are then often qualified as "solid" panels. They may also be made of a number of distinct materials assembled with a view to improving one or more specific qualities, and are then often qualified as "composite" panels.

Document US2017/0044766 thus describes a composite floor covering made from a so-called 3-D woven fabric comprising two planar textile faces linked by spacing elements which keep the two faces parallel to and some distance apart, this 3-D woven fabric being in the form of a mesh through which cement can be poured in order to create a reinforced floor. This structure needs to be laid on a horizontal support as the panel is unable to contain the filling material.

Document WO2019/197319 describes a composite material consisting of a 3-D woven fabric comprising two faces the separation of which is regulated by spacers, and of a polyurethane foam, this material being intended to form the sole of an item of footwear, the spacers performing a mechanical-integrity function by maintaining a space between the two faces of the woven fabric, affording resistance to the successive compressions experienced by the sole.

Documents US2010/0233417 and WO2015/053842 describe a flexible textile composite able to "set" (in the way that a cement "sets"), which is to say able to become rigid or semi-rigid through the application of a liquid or of a radiation, this composite being made up of a 3-D woven fabric having two planar faces and spacers and containing a powder. The powder is incorporated via one of the faces of the woven fabric, this face being able to deform in order to create the spaces necessary for the incorporation of said powder and of contracting in order to contain the same, the face or faces of the woven fabric being moreover permeable to the liquid or radiations required for causing the powder to set in order to rigidify the composite. The faces are held some distance apart by the spacers which may individually consist of a group of fibres or of a monofilament. Although, according to US2010/0233417, there is theoretically no limit to the thickness of the composite, the constraints listed, and notably the ability of the liquid to penetrate to the core of the powdery material before the outer parts have hardened, the ability of the faces to support the weight of the powder, and the constraints regarding the rigidity of the spacers in order for them to be able to correctly perform their function of maintaining the space between the two internal faces of the composite, limit these composites to relatively small thicknesses, typically of the order of a few millimetres, as demonstrated by the "typically . . . " examples as shown in the examples of WO2015/053842.

Document WO2015/187826 describes a textile composite comprising a nonwoven fabric of which one face is permeable to the liquid and the other face is impermeable, the fabric being filled with a material able to become rigid upon contact with the liquid. The two faces of the fabric are separated by a collection of self-supporting fibres, which is to say fibres which, overall, maintain the spacing between the two faces and are able to resist compressive mechanical forces. When this composite is curved, before the filling material hardens, wrinkles form at its surface.

Whatever the function or location of these panels, ease of implementation and preservation of their integrity are sought. While it is easy to create or cover planar surfaces, complex surfaces such as curved surfaces or, even, irregular surfaces, may be particularly tricky to construct or to cover.

There is therefore a need for panels offering complex shapes, which are simple to use and able to meet numerous needs.

SUMMARY

In order to meet these needs, the applicant company has developed a panel having a first woven fabric, a second woven fabric linked to the first woven fabric by a linking structure, the first woven fabric being deformable in at least a main direction of the first woven fabric. This panel may be filled with a filling material the nature of which will be dependent on the envisaged use for the panel.

DETAILED DESCRIPTION

Definitions

The compounds comprising carbon mentioned in the description may be of fossil or biobased origin. In the latter case, they may be partially or totally derived from biomass or may be obtained from renewable starting materials derived from biomass. Polymers, plasticizers, fillers, and the like, are notably concerned. "Substantially parallel" or "extending substantially in", mean that the angle formed by the two directions in question is less than 10°, preferably less than 5°, preferably less than 2° and as a very strong preference less than or equal to the error in angle measurement by a suitable method.

Two lengths are substantially equal if they are equal, to within the usual measuring tolerance for measuring such lengths or to within the tolerance of the manufacturing method using these substantially same-length elements.

As known by a person skilled in the art, plastic deformation of a filamentary element means that when this element is stretched in its overall direction, its deformation is irreversible. In other words, it does not revert back to its initial shape when the stress loading is removed.

A woven fabric is said to be deformable if at least one surface portion of said woven fabric is deformable.

Woven Fabric Panel

The invention relates to a panel comprising:
  a first woven fabric comprising filamentary elements (C1), referred to as warp elements, which are substantially parallel to one another and extend in a direction referred to as the warp direction, which constitutes a first main direction of the first woven fabric, filamentary elements (T1), referred to as weft elements, which are substantially parallel to one another and extend in a direction referred to as the weft direction, which constitutes a second main direction of the first woven fabric, different from the first main direction of the first woven fabric;

a second woven fabric comprising filamentary elements (C2), referred to as warp elements, which are substantially parallel to one another and extend in a direction referred to as the warp direction, which constitutes a first main direction of the second woven fabric, second filamentary elements (T2), referred to as weft elements, which are substantially parallel to one another and extend in a direction referred to as the weft direction, which constitutes a second main direction of the second woven fabric, different from the first main direction of the second woven fabric;

a linking structure comprising n filamentary elements linking the first woven fabric to the second woven fabric, each filamentary element comprising at least one filamentary portion, referred to as a stay, extending between the first and second woven fabrics and linking the first woven fabric to the second woven fabric, each stay i having an at-rest length $h_i$ and extending from a point of attachment to the first woven fabric to a point of attachment to the second woven fabric;

characterized in that each stay of the linking structure has an at-rest length that is substantially equal to the mean $\overline{h_m}$ of the at-rest lengths of the stays, m representing the total number of stays of the linking structure, and in that the first woven fabric is plastically deformable in at least one of the first and second main directions of the first woven fabric.

What is meant by the mean of the at-rest lengths $\overline{h_m}$ of the stays is the mean of the-at-rest lengths of the stays of the linking structure, the total number of stays of the linking structure of the panel according to the invention being equal to m, which is an integer number strictly greater than 0. Thus, $$\overline{h_m} = \frac{1}{m}\sum_{i=1}^{m} h_i.$$

The total number of stays is adjusted according to the geometry of the panel, to the desired rigidity effect, and to the fluidity characteristics of any filling material that may be introduced into the panel. The elongation at break values of the filamentary elements are measured in accordance with the standard ASTM D885-03.

The deformation of the first woven fabric in at least one main direction of the first woven fabric allows the panel, after shaping, to conform to or to define a complex non-planar surface, for example a cylindrical or wavelike surface, or even a non-uniform surface for example a hemispherical surface.

What is meant by shaping or conforming is the shaping of the panel by the deforming of the woven fabric. The shaping may be performed for example by injecting a filling material between the internal face of the first woven fabric and the internal face of the second woven fabric, or by inflating with a gas, for example air or an inert gas such as nitrogen, by injecting the gas under pressure between the internal faces of the first and of the second woven fabrics of the panel. A person skilled in the art will therefore ensure that the faces are impervious to this pressurized gas by coating or skimming with a suitable material.

Filling Material

As a preference, the panel according to the invention comprises, between the internal face of the first woven fabric and the internal face of the second woven fabric, a filling material.

The filling material may be any material that allows the panel according to the invention to perform the function for which it is intended. The filling material needs to be in a form that allows it to be incorporated between the two internal faces of the woven fabrics that make up the panel according to the invention. The filling material may be in the form of a gas, of a liquid or of a divided solid at the moment at which it is incorporated between the internal faces of the panel. Thus, the filling material may for preference be any powder, gas or liquid, derived from natural or recycled materials, possibly crushed or incorporated in the molten state in the panel according to the invention.

The filling material may be a material of the cement, cement-based foam or concrete type when the panel is intended to be used as a structural element.

The filling material may also be an insulating material, such as for example an expanded polyurethane foam, a divided solid material such as granules of polystyrene, cork, clay.

The filling material may equally be selected from waste products: spoil, crushed building or infrastructure rubble.

Thus, the filling material may preferably be selected from sand, cement, a cement-based foam, plaster, soil, clay, natural fibres, inorganic fibres, polystyrene, polyurethane, cork, spoil and crushed building or infrastructure rubble.

The filling material may equally be a pressurized gas, possibly a gas circulating under pressure when the panel according to the invention is used for ducting.

In another arrangement, the filling material may preferably be an expanded material, preferably an expanded foam, preferably an expanded polyurethane foam. The benefit of filling the panel according to the invention with an expanding material is that the panel can be shaped as the expanding material expands.

The filling material may be injected in numerous ways. For example, the filling material may be injected via at least one of the ends of the three-dimensional woven fabric using one or more nozzles, the material progressively flowing into the three-dimensional woven fabric either under the effect of gravity or "driven" by the stream of filling material.

It is thus possible to obtain insulating panels suitable for hugging walls that are curved or of complex shapes.

Woven Fabrics for the Panel According to the Invention

The first woven fabric of the panel according to the invention comprises filamentary elements (C1), referred to as warp elements, which are substantially parallel to one another and extend in a direction referred to as the warp direction, which constitutes a first main direction of the first woven fabric, filamentary elements (T1), referred to as weft elements, which are substantially parallel to one another and extend in a direction referred to as the weft direction, which constitutes a second main direction of the first woven fabric different from the first main direction of the first woven fabric.

The first woven fabric is characterized in that it is plastically deformable in at least one main direction. What is meant by deformable is that the woven fabric can extend in at least one main direction without breaking.

By plastically deforming the first woven fabric, the panel according to the invention can be shaped and maintain its shape. This is particularly advantageous when the panel according to the invention contains a filling material, particularly when this filling material is a material able to become rigid. The plastic deformation of the first woven fabric of the panel according to the invention allows the filling material to become rigid without the need to maintain tension on the first woven fabric of the panel according to the invention, something which would not be the case if the first woven fabric were to deform elastically.

As a preference, the second woven fabric is deformable in at least one main direction of the second woven fabric.

In a preferred arrangement, the second woven fabric deforms plastically. In another preferred arrangement, the second woven fabric deforms elastically.

Deformable woven fabrics are well known to those skilled in the art. The deformability of the woven fabric may be obtained in a number of ways. For example, the deformability may be obtained as a result of the weave of the woven fabric. It may also be obtained through the nature of the filamentary warp elements and/or of the filamentary weft elements.

Thus, the deformability of the woven fabric can be obtained by using bouclé filamentary elements, which are therefore able to stretch, elastic filamentary elements, filamentary elements capable of plastic deformation without breaking or with partial breakage of the filamentary element. Of these, mention may be made for example of covered filamentary elements, in which a core of the filamentary element breaks when the filamentary element is subjected to traction without the rest of the filamentary element breaking.

As a preference, at least one woven fabric selected from the first woven fabric and the second woven fabric comprises at least one deformable zone deformable in at least one main direction of said woven fabric and at least one non-deformable zone that is non-deformable in at least one main direction of said woven fabric.

The presence of deformable zones and of non-deformable zones makes it possible to adjust the shape of the surface of the woven fabric after the shaping of the panel according to the invention. Thus, the panel according to the invention may, after shaping, for example exhibit planar zones and deformed zones.

In a preferred arrangement, at least one woven fabric selected from the first woven fabric and the second woven fabric comprises at least one deformable zone deformable in the main direction of said woven fabric and non-deformable in the second main direction of said woven fabric.

In this preferred arrangement, the woven fabric may deform in a first main direction while not deforming in the second main direction, making it possible to form surfaces having a sinusoidal-type profile in the first main direction while substantially maintaining their length in the second main direction.

As a preference, at least one woven fabric selected from the first woven fabric and the second woven fabric comprises at least one deformable zone, the deformable zone comprising at least one filamentary element ED deformable under traction, wherein, for any traction-deformable filamentary element ED, there is an elongation AED<ARED that is such that M1ED/M2ED<1, where M1ED represents the modulus of the deformable filamentary element ED for any elongation less than or equal to K1×AED %, M2ED represents the modulus of the deformable filamentary element ED for any elongation greater than or equal to K2×AED %, ARED representing the elongation at break of the element ED, as a %, with K1 ranging from 0.8 to 0.95 and K2 ranging from 1.05 to 1.2, the modulus values M1ED, M2ED and the elongation at break ARED being measured in accordance with the standard ASTM D885-03.

Such a filamentary element ED exhibits what is known as a "bi-modulus" behaviour known from elsewhere to those skilled in the art, this element exhibiting greater resistance to elongation when the elongation of the element ED is greater than AED than when this elongation is less than AED.

Such an element makes it possible to obtain a deformable woven fabric offering low resistance to deformation during shaping, and high resistance to deformation once the woven fabric has been shaped, making it possible to obtain panels that are both easy to shape and offer good geometric stability once shaped. Thus, even if, once shaped, the panel exhibits a complex shape, it is, prior to shaping, of a very simple shape, close to a flat woven fabric, that can easily be stored and transported in the form of stacks of panels or wound onto a reel with the greatest compactness.

As a preference, each filamentary element ED comprises first and second filamentary members. As a preference, each filamentary member has a different modulus and/or has a different length for a given length of filamentary element ED in order to obtain this bi-modulus behaviour.

As a preference, the second filamentary member is substantially rectilinear, the first filamentary member being wound substantially in a helix around the second filamentary member.

As a preference, for each filamentary element ED, the second filamentary member exhibits within the filamentary element ED, an elongation prior to breakage greater than AED %, and the first filamentary member exhibits an elongation prior to breakage within the filamentary element ED less than $A_{ED}$%.

As a preference, the first and second woven fabrics comprise, independently of one another, a material selected from a polyester, a polyamide, a polyketone, a polyurethane, a natural fibre, an inorganic fibre, a cellulose fibre and a collection of these materials, preferably selected from a polyester, a polyamide, a polyketone, a polyurethane, a natural fibre, a cellulose fibre and a collection of these materials, and more preferentially selected from a polyester, a natural fibre, a cellulose fibre and a collection of these materials.

In a preferred arrangement, at least one of the woven fabrics comprises a material that is fire-retardant either through its nature or by having a fire-retardant treatment.

As a preference, when the panel according to the invention comprises a filling material, at least one of the first woven fabric and second woven fabric is arranged in such a way as to be impervious to the filling material. Thus, the filling material is unable to flow through the woven fabric intended to be impervious to said material. As a preference, both of the two woven fabrics of the panel according to the invention are intended to be impervious to the filling material.

Linking Structure

The panel according to the invention comprises a linking structure comprising filamentary elements linking the first woven fabric to the second woven fabric, each filamentary element comprising at least one filamentary portion, referred to as a stay, extending between the first and the second woven fabrics and linking the first woven fabric to the second woven fabric, each stay i having an at-rest length $h_i$ and extending from a point of attachment to the first woven fabric to a point of attachment to the second woven fabric, each stay of the linking structure having an at-rest length that is substantially equal to the mean at-rest length $\overline{h_m}$ of the stays.

What is meant by the at-rest length of a stay is the length of the stay in the longitudinal direction in the absence of any external stress loading applied to the stay (other than atmospheric pressure). A stay at rest in its longitudinal direction is neither under tension nor in compression in this direction and therefore exhibits zero elongation in this direction. Likewise, and in general, what is meant by the at-rest length of a filamentary element is the length of the filamentary element in its longitudinal direction in the absence of any external stress loading applied to the filamentary element (other than atmospheric pressure).

A filamentary element means any longilinear element of great length relative to its cross section, whatever the shape of the latter, for example circular, oblong, rectangular or square, or even flat, it being possible for this filamentary element to be twisted or wavy, for example. When its cross section is circular in shape, the diameter of this cross section is preferably less than 5 mm, more preferably comprised in a range ranging from 10 μm to 1.2 mm.

Each filamentary element of the linking structure, notably each stay that links the internal faces of the first and second woven fabrics to one another, can be characterized geometrically by its at-rest length LP and by its mean cross section SP, which is the mean of the cross sections obtained by sectioning the stay on all the surfaces parallel to the first and second woven fabrics and comprised between the first and second woven fabrics. In the most frequent case of a constant cross section of the filamentary element and of the stay, the mean cross section SP is equal to this constant cross section.

Each filamentary element of the linking structure, notably each stay, typically has a smallest characteristic dimension E of its mean cross section SP that is preferably at most equal to 0.02 times the mean at-rest length $\overline{h_m}$ of the stays and an aspect ratio R for its mean cross section SP that is preferably at most equal to 3. A smaller characteristic dimension E of the mean cross section SP of the load-bearing element at most equal to 0.02 times the mean at-rest length $\overline{h_m}$ of the stays rules out any massive load-bearing element having a large volume.

An aspect ratio R of its mean cross section SP at most equal to 3 means that the largest characteristic dimension V of its mean cross section SP is at most equal to 3 times the smallest characteristic dimension E of its mean cross section SP. By way of example, a circular mean cross section SP, having a diameter equal to d, has an aspect ratio R=1; a rectangular mean cross section SP, having a length V and a width V', has an aspect ratio R=V/V'; and an elliptical mean cross section SP, having a major axis B and a minor axis B', has an aspect ratio R=B/B'.

The mean at-rest length $\overline{h_m}$ of the stays is preferably greater than 8 mm, preferably comprised between 10 and 2000 mm, preferentially comprised between 10 and 1000 mm, preferentially comprised between 10 and 500 mm, highly preferentially comprised between 30 and 100 mm, and as a very strong preference, comprised between 40 and 70 mm. This mean at-rest length may be adjusted according to the destined use of the panel according to the invention.

A stay has mechanical behaviour of the filamentary type, which is to say that it can be subjected only to tensile or compression forces along its mean line. Each stay of the linking structure is flexible. That means to say that it is able to bend without breaking and without deforming plastically. The linking structure is such that it is unable by itself to support the spacing between the two faces of the panel according to the invention. With neither filling nor internal pressure, the two faces can move closer to one another with no load being applied.

In one preferred embodiment, each filamentary element of the linking structure is a textile element. What is meant by textile is that each filamentary element of the linking structure is nonmetallic, and is, for example, made of a material selected from a polyester, a polyamide, a polyketone, a polyvinyl alcohol, a cellulose, a mineral fibre, a natural fibre, an elastomer material or a mixture of these materials. Mention may be made, among polyesters, for example, of PET (polyethylene terephthalate), PEN (polyethylene naphthalate), PBT (polybutylene terephthalate), PBN (polybutylene naphthalate), PPT (polypropylene terephthalate) or PPN (polypropylene naphthalate). Mention may be made, among polyamides, of aliphatic polyamides, such as polyamides 4-6, 6, 6-6 (nylon), 11 or 12, and aromatic polyamides, such as aramid.

For example, each filamentary element of the linking structure is a textile assembly comprising one or more monofilament or multifilament textile fibres, twisted or not twisted together. Thus, in one embodiment, it will be possible to have an assembly in which the fibres are substantially parallel to one another. In another embodiment, it will be possible to also have an assembly in which the fibres are helically wound, such as a twist or an overtwist. In yet another embodiment, each filamentary element consists of a monofilament. Each monofilament or multifilament fibre has a diameter which may range from a few hundredths of a millimetre to a few millimetres, typically comprised between 0.001 and 5 mm, preferably comprised between 5 and 50 μm, and preferentially comprised between 10 and 40 μm.

In a preferred arrangement, each filamentary element of the linking structure is a multifilament textile fibre, each fibril that makes up the textile fibre having a diameter comprised between 0.001 and 0.5 mm, preferably comprised between 5 and 50 μm, and preferentially comprised between 10 and 40 μm. Such filamentary elements have the advantage of being more flexible than monofilament filamentary elements. The woven fabric according to the invention comprising such filamentary elements can thus be stored in a very compact manner by bringing the internal faces of the first woven fabric and of the second woven fabric closer together. As a preference with this arrangement, the filamentary elements are arranged in such a way that the stays are unable by themselves to maintain the spacing between the internal faces of the two woven fabrics when the panel is subjected to a compressive loading, which is to say to a force applied to the panel perpendicular to its surface and in its direction. This arrangement is obtained by adjusting the density of the stays, expressed in terms of the number of stays per square metre, and/or by adjusting the flexibility of the stays through the thread count or the chemical nature of the filamentary elements. However, the stays do need to have enough strength to maintain the spacing between the two internal faces of the woven fabrics once the filling material has been introduced between the two internal faces of the panel according to the invention by withstanding the pressure incurred by the introduction of the filling material, which is to say by having sufficient tensile strength. This strength can be adjusted through the density of the stays and/or their tenacity and/or their chemical nature.

In another embodiment, each filamentary element of the linking structure is made of metal, for example is a metal monofilament or collection of metal monofilaments, each metal monofilament having a diameter that may range from a few hundredths of a millimetre to a few millimetres, and typically comprised between 0.01 and 5 mm. In one embodiment, each filamentary element of the linking structure consists of a collection of several metal monofilaments. In another embodiment, each filamentary element consists of a metal monofilament.

In one embodiment, each filamentary element of the linking structure extends alternately from the first woven fabric towards the second woven fabric and from the second woven fabric towards the first woven fabric, when progressing along the length of the filamentary element.

In one embodiment, each filamentary element of the linking structure comprises a first filamentary portion for anchoring each filamentary element of the linking structure in the first woven fabric, prolonging the stay into the first woven fabric.

Preferably, each first anchoring filamentary portion is interlaced with the first woven fabric. Such an assembly exhibits the advantage of being able to be manufactured in a single stage. However, it is also possible to envisage manufacturing the panel according to the invention in two stages, a first stage of manufacture of the first woven fabric and a second stage of interlacing the filamentary element or elements of the linking structure with the first woven fabric. In both cases, the interlacing of each filamentary element of the linking structure with the first woven fabric makes it possible to ensure the mechanical anchoring of each filamentary element of the linking structure in the first woven fabric and thus to confer the desired mechanical properties on the linking structure.

In one embodiment, in order to ensure the mechanical anchoring of the filamentary anchoring portion, each first filamentary anchoring portion is wound at least in part around at least one first filamentary element of the first woven fabric.

Preferably, the first woven fabric comprises:
filamentary elements, referred to as warp elements, which are substantially parallel to one another and extend in a first direction, referred to as the warp direction, substantially parallel to the first main direction of the first woven fabric, and
filamentary elements, referred to as weft elements, which are substantially parallel to one another and extend in a second direction, referred to as the weft direction, intertwining with the filamentary warp elements,
each first filamentary anchoring portion being wound at least in part around at least one filamentary weft element of the first woven fabric, preferably around at least two filamentary weft elements that are adjacent in the first main direction of the first woven fabric.

In one embodiment, each first filamentary anchoring portion extends in a direction substantially parallel to the first main direction of the first woven fabric.

Preferably, each first filamentary anchoring portion passes alternately from one face of the first woven fabric to the other face of the first woven fabric between two filamentary weft elements that are adjacent and around which the first filamentary anchoring portion is wound.

As a preference, when the panel according to the invention comprises a filling material, at least one of the first woven fabric and second woven fabric is arranged in such a way as to be impervious to the filling material. Thus, the filling material is unable to flow through the woven fabric intended to be impervious to said material. As a preference, both of the two woven fabrics of the panel according to the invention are intended to be impervious to the filling material.

Deformable and Non-Deformable Zones of the Woven Fabric

In a preferred embodiment making it possible to effectively shape the first woven fabric of the panel according to the invention, the first woven fabric comprises:
a first group of zones comprising at least one transverse straight zone (Z1), each transverse straight zone (Z1) of the first group of zones being arranged so as to allow elongation of at least one transverse straight zone (Z1) of the first group (Q1) of zones in the first main direction of the first woven fabric, preferably elongation of each transverse straight zone (Z1) of the first group (Q1) of zones in the first main direction of the first woven fabric,
a second group of zones comprising at least one transverse straight zone (Z2), each transverse straight zone (Z2) of the second group of zones being arranged in such a way as to prevent elongation of said transverse straight zone (Z2).

By definition, a transverse straight zone of the woven fabric is longitudinally delimited by two imaginary straight lines substantially perpendicular to the first main direction of the first woven fabric. A transverse straight zone extends across the entire width of the woven fabric, which means to say that the transverse straight zone is transversely delimited by the longitudinal edges of the woven fabric.

As a preference, in the arrangement in which each filamentary element ED comprises first and second filamentary members, each transverse straight zone of the first group of zones is arranged in such a way as to allow elongation of each filamentary warp element in the first main direction in each transverse straight zone of the first group of zones.

The elongation of each filamentary warp element ED can be obtained by any means, for example by first filamentary elements as described in applications WO2018/130782 and WO2018/130783.

In an embodiment that makes it possible to obtain transverse straight zones (Z2) of the second group of non-deformable zones, each transverse straight zone (Z2) of the second group of zones is arranged in such a way as to prevent elongation of each filamentary warp element in the first overall direction in each transverse straight zone (Z2) of the second group of zones.

In the preferred embodiments described above, each transverse straight zone (Z1) of the first group of zones is a so-called deformable zone. Such zones are deformable under the shaping conditions and contribute to the conformability of the first woven fabric. Each transverse straight zone (Z2) of the second group of zones is a so-called non-breakable zone. Optionally, in one embodiment, each transverse straight zone (Z2) of the second group of zones is non-deformable. In another embodiment, each transverse straight zone (Z2) of the second group of zones is deformable but to a much lesser extent than each transverse straight zone (Z1) of the first group of zones. Such zones are unbreakable under the shaping conditions and do not contribute, or contribute very little, to the conformability of the first woven fabric. Thus, each so-called deformable transverse straight zone (Z1) of the first group of zones deforms sufficiently to allow the assembly to be shaped and compensates for the non-elongation or the slight elongation of the non-breakable transverse straight zones (Z2) of the second group of zones. The elongation at maximum force of all of the transverse straight zones of the first group of zones will be greater, the shorter and fewer in number are the so-called deformable transverse straight zones of the first group of zones in comparison with the unbreakable transverse straight zones of the second group of zones. At the scale of the filamentary warp elements, those portions of each first filamentary warp element that are situated in each so-called deformable transverse straight zone (Z1) of the first group of zones deform enough to allow the assembly to be shaped and compensate for the non-elongation or slight elongation of those portions of each first filamentary warp element that are situated in the unbreakable transverse straight zones (Z2) of the second group of zones.

Also, each so-called deformable zone of the first group of zones is deformable under a relatively low stress making it possible, during the method of shaping the panel according to the invention, to use a suitable shaping stress corresponding for example to the insertion of the filling material between the two internal faces of the first and second woven fabrics of the panel according to the invention.

In one preferred embodiment, each load-bearing filamentary element comprises a first filamentary portion for anchoring each load-bearing filamentary element in the first woven fabric, prolonging the load-bearing filamentary portion in the first woven fabric:

each transverse straight zone (Z1) of the first group of zones being devoid of any first filamentary anchoring portion, each transverse straight zone (Z2) of the second group of zones comprising at least one first filamentary anchoring portion.

As a preference, each transverse straight zone (Z1) of the first group of zones alternates, in the first main direction of the first woven fabric, with a transverse straight zone (Z2) of the second group of zones.

Thus, on the scale of the first woven fabric, uniform deformation of the whole of the first woven fabric is obtained, this deformation being all the more uniform the shorter the at-rest length of each transverse straight zone in the first main direction of the first woven fabric. What is meant by the at-rest length of a transverse straight zone in the first general direction is the length of the zone in the longitudinal direction in the absence of any external stress loading applied to the zone (other than atmospheric pressure). A transverse straight zone at rest in the first general direction is neither under tension nor in compression in this direction and therefore exhibits zero elongation in this direction.

The features set out hereinabove in relation to the transverse straight zones (Z1) and (Z2) apply mutatis mudandis preferably to the second woven fabric of the panel according to the invention.

Manufacture of the Panel

In a step of forming the panel according to the invention, the first filamentary elements 64, 66 are assembled in such a way as to form the first woven fabric 26 and the second filamentary elements 68, 70 are assembled in such a way as to form the second woven fabric 28. The load-bearing elements, which may be coated with an adhesive composition, preferably cross-linked composition 32 are also assembled with the first and second woven fabrics 26, 28. In the embodiment described as an example, the first and second filamentary elements 64, 66, 68, 70 are assembled in a single step, and therefore simultaneously, with the load-bearing elements 32 so as to form the panel 24. In another embodiment, each first and second woven fabric 26, 28 is first formed separately, then the first and second woven fabrics 26, 28 are linked together using the load-bearing elements 32 which may have been coated with an adhesive composition, preferably cross-linked composition. The step of forming the panel 24 according to the invention is implemented in a manner known to those skilled in the art of weft woven fabrics.

Assembly

The invention also relates to an assembly comprising at least one panel according to the invention. An assembly is an assembled entity that may combine any element including at least one panel according to the invention. Such an assembly may, for example, and nonlimitingly, be a built structure such as a warehouse, a building, a house, an aircraft, a ship or a land vehicle. This assembly may equally be trunking, a duct or a container.

BRIEF DESCRIPTION OF THE FIGURES

FIG. 1 Schematic general arrangement of a panel according to the invention comprising a first woven fabric comprising a deformable zone.

FIG. 2 Schematic general arrangement of a panel according to the invention comprising a first woven fabric comprising a deformable zone and a second woven fabric comprising a deformable zone.

FIG. 3 View from above of the panel according to the invention.

FIG. 4 View in cross section, on the plane of cross section P-P', of the panel according to the invention.

FIG. 1 depicts a schematic general arrangement of a cross section through a panel (10) according to the invention, comprising a first woven fabric (1) comprising a deformable zone (2), a second woven fabric (3) and a linking structure comprising filamentary elements linking the first woven fabric to the second woven fabric, each filamentary element comprising at least one filamentary portion, referred to as a stay (4), linking the first woven fabric (1) to the second woven fabric (3), each stay of the linking structure having an at-rest length substantially equal to the mean at-rest length $\overline{h_m}$ of the stays. The deformable zone (2) has been depicted with a greater thickness solely to make the diagram easier to interpret. The filling material that is preferably present between the internal face of the first woven fabric (1) and the internal face of the second woven fabric (2) is not depicted in FIG. 1. It may be seen that it is possible to conform to a curved surface without the need to use a multitude of flat panels to approximate the curvature of the surface, making work far easier.

FIG. 2 depicts a schematic general arrangement of a panel (11) comprising a deformable zone (A) of the first woven fabric and a deformable zone (B) of the second woven fabric. This diagram illustrates how complex shapes can be obtained with the panel according to the invention.

FIG. 3 depicts a view from above of a panel (10) according to the invention and FIG. 4 depicts a schematic view in cross section through a panel (10). In these two figures, the same elements are numbered in the same way.

The first woven fabric 26 comprises two longitudinal edges 26A and 26B. The first woven fabric 26 extends in a first main direction of the first woven fabric G1 substantially parallel to each longitudinal edge 26A, 26B. The first woven fabric 26 comprises filamentary elements 64, referred to as filamentary warp elements, and filamentary elements 66 referred to as filamentary weft elements. The filamentary warp elements 64 of the first woven fabric 26 are substantially parallel to one another and extend in a direction, referred to as the warp direction C1, substantially parallel to the first main direction Q1. The filamentary weft elements 66 of the first woven fabric 26 are substantially parallel to one another and extend in a direction, referred to as the weft direction T1, interlacing with the filamentary warp elements 64. The filamentary warp elements 64 extend continuously along the entire length of the first woven fabric 26.

Each filamentary element 64, 66 here is, for example, a textile filamentary element.

The filamentary elements 64 are all substantially identical. Each filamentary warp element 64 comprises first and second filamentary members 65, 67. The second filamentary member 67 is substantially rectilinear and the first filamentary member 65 is wound substantially in a helix around the second filamentary member 67. Here, the first filamentary member 65 is a multifilament strand made of PET having a count equal to 110 tex and the second filamentary member 67 is a multifilament strand made of rayon with a count of 23 tex.

The filamentary elements 66 here comprise two filamentary members, the second filamentary member being substantially rectilinear and the first filamentary member being wound substantially in a helix around the second filamentary member. Here, the first filamentary member is a multifilament strand made of PET having a count equal to 110 tex and the second filamentary member is a multifilament strand made of rayon with a count of 23 tex.

The second woven fabric 28, depicted in FIG. 4, extends in a first main direction of the second woven fabric G2. The second woven fabric 28 comprises filamentary elements 68, referred to as filamentary warp elements, and filamentary elements 70 referred to as filamentary weft elements. The filamentary warp elements 68 of the second woven fabric 28 are substantially parallel to one another and extend in a direction, referred to as the warp direction C2, substantially parallel to the first main direction of the second woven fabric G2. The filamentary weft elements 70 of the second woven fabric 28 are substantially parallel to one another and extend in a direction, referred to as the weft direction T2, interlacing with the filamentary warp elements 68. The filamentary warp elements 68 extend continuously along the entire length of the second woven fabric 28.

Each filamentary element 68, 70 here is, for example, a textile filamentary element.

The filamentary elements 68 are all substantially identical and here are a multifilament strand made of PET having a count equal to 110 tex.

The filamentary elements 70 are all substantially identical and here are a multifilament strand made of PET having a count equal to 167 tex.

The panel (10) comprises a linking structure comprising filamentary elements linking the first woven fabric (26) to the second woven fabric (28), each filamentary element comprising at least one filamentary portion (74) referred to as a stay, extending between the first and second woven fabrics and linking the first woven fabric to the second woven fabric. Each filamentary element 32 extends alternately from the first woven fabric 26 towards the second woven fabric 28 and from the second woven fabric 28 towards the first woven fabric 26, when progressing along the filamentary bearing element 32. Each load-bearing filamentary element 32 here is a textile load-bearing filamentary element, made of PET and with a count of 55 tex.

Each filamentary element 32 comprises a load-bearing filamentary portion 74 extending between the first and second woven fabrics 26, 28, notably between the internal faces 42 and 46. Each filamentary bearing element 32 comprises first and second filamentary anchoring portions 76, 78 for anchoring the filamentary bearing element 32 respectively in the first woven fabric 26 and the second woven fabric 28. Each first and second filamentary anchoring portion 76, 78 prolongs the load-bearing portion 74 respectively into each first woven fabric 26 and second woven fabric 28. Each first and second filamentary anchoring portion 76, 78 is interlaced respectively with each first woven fabric 26 and second woven fabric 28. Each first and second filamentary anchoring portion 76, 78 is wound at least in part around respectively at least one first filamentary element 64, 66 of the first woven fabric 26 and at least one second filamentary element 68, 70 of the second woven fabric 28. In this way, each filamentary anchoring portion 76, 78 joins two load-bearing filamentary portions 74 together and each load-bearing filamentary portion 74 joins two filamentary anchoring portions 76, 78 together.

In this instance, each first filamentary anchoring portion 76 is wound at least in part around at least one filamentary weft element 66 of the first woven fabric 26 and, in this instance, preferably around at least two filamentary weft elements 66 that are adjacent in the first main direction of the first woven fabric Q1. Similarly, each second filamentary anchoring portion 78 is wound at least in part around at least one filamentary weft element 68 of the second woven fabric 28, preferably around at least two filamentary weft elements 66 that are adjacent in the in the first main direction of the second woven fabric G2.

Each first and second filamentary anchoring portion 76, 78 extends in a direction substantially parallel respectively to the first main direction of the first and of the second woven fabric G1, G2.

Each first filamentary anchoring portion 76 passes alternately from the face 41 to the face 42 between two filamentary weft elements 66 that are adjacent and around which the first filamentary anchoring portion 76 is wound. Analogously, each second filamentary anchoring portion 78 passes alternately from the face 46 to the face 49 between two filamentary weft elements 68 that are adjacent and around which the second filamentary anchoring portion 78 is wound.

The first woven fabric 26 depicted in FIGS. 3 and 4 comprises transverse straight zones Z1 of a first group of zones, each transverse straight zone Z1 having an at-rest length Ld1 in the first main direction of the first woven fabric G1 and extending over the entire width of the first woven fabric 26. All of the transverse straight zones Z1 of the first group of transverse straight zones may be identical or they may differ according to the sought-after shape for the shaped panel.

The first woven fabric 26 depicted in FIGS. 3 and 4 also comprises transverse straight zones Z2 of a second group of zones, each transverse straight zone Z2 having an at-rest length Ld2 in the first main direction of the first woven fabric G1 and extending over the entire width of the first woven fabric 26. All of the transverse straight zones Z2 of the second group of transverse straight zones may be identical or they may differ according to the sought-after shape for the shaped panel.

Each transverse straight zone Z1 of the first group of zones alternates, in the first main direction of the first woven fabric, with a transverse straight zone Z2 of the second group of zones.

EXAMPLES

Two panels are manufactured. A first panel corresponds to that depicted in FIGS. 3 and 4. The second panel has a first woven fabric and a second woven fabric which are identical to the first panel, but does not have a linking structure. The characteristics of the first and second woven fabrics and of the linking structure, where present, are indicated in Table 1 below.

TABLE 1

|  |  | Material | Count | Filament density |
|---|---|---|---|---|
| First woven fabric | Filamentary warp elements | PET | 110 | 104 ± 4/dm |
|  | Filamentary weft elements | PET | 167 | 81 ± 4/dm |
| Second woven fabric | Filamentary warp elements | PET | 110 | 104 ± 4/dm |
|  | Filamentary weft elements | PET | 167 | 81 ± 7/dm |
| Linking structure | Filamentary elements | PET | 55 | Approx. 70000/m² |

The two panels exhibit the following geometric characteristics:
Thickness: 40 mm
Width: 150 mm
Length: 500 mm They are then filled with polyurethane foam. A so-called "3-point" measurement is made on each of these panels in accordance with standard NF EN 12089. The results are presented in Table 2.

TABLE 2

|  | First panel | Second panel |
|---|---|---|
| $E_{mod}$ (kPa) | 8788 | 5450 |
| $F_{max}$ (N) | 326 | 135 |
| $\sigma_M$ at $F_{max}$ (kPa) | 427 | 177 |

The panels according to the invention, aside from their ability to be shaped to a complex surface shape, additionally offer excellent structural strength.

The invention claimed is:

1. A panel comprising:
   a first woven fabric comprising filamentary warp elements, which are substantially parallel to one another and extend in a warp direction, which constitutes a first main direction of the first woven fabric, and filamentary weft elements, which are substantially parallel to one another and extend in a weft direction, which constitutes a second main direction of the first woven fabric, different from the first main direction of the first woven fabric;
   a second woven fabric comprising filamentary warp elements, which are substantially parallel to one another and extend in a second warp direction, which constitutes a first main direction of the second woven fabric, and second filamentary weft elements, which are substantially parallel to one another and extend in a second weft direction, which constitutes a second main direction of the second woven fabric, different from the first main direction of the second woven fabric; and
   a linking structure comprising n filamentary elements linking the first woven fabric to the second woven fabric, each filamentary element comprising at least one stay, extending between the first and second woven fabrics and linking the first woven fabric to the second woven fabric, each stay i having an at-rest length $h_i$ and extending from a point of attachment to the first woven fabric to a point of attachment to the second woven fabric,
   wherein each stay of the linking structure has an at-rest length that is substantially equal to a mean $\overline{h_m}$ of the at-rest lengths of the stays, m representing a total number of stays of the linking structure, and
   wherein the first woven fabric is plastically deformable in at least one of the first and second main directions of the first woven fabric.

2. The panel according to claim 1, further comprising a filling material between an internal face of the first woven fabric and an internal face of the second woven fabric.

3. The panel according to claim 2, wherein the filling material is selected from the group consisting of sand, cement, a cement-based foam, plaster, soil, clay, natural fibers, inorganic fibers, polystyrene, polyurethane, cork, spoil and crushed building or infrastructure rubble.

4. The panel according to claim 2, wherein the filling material is an expanded material.

5. The panel according to claim 1, wherein the second woven fabric is deformable in at least one of the first and second main directions of the second woven fabric.

6. The panel according to claim 5, wherein the second woven fabric deforms plastically.

7. The panel according to claim 5, wherein the second woven fabric deforms elastically.

8. The panel according to claim 1, wherein at least one woven fabric selected from the first woven fabric and the second woven fabric comprises at least one deformable zone, the at least one deformable zone comprising at least one filamentary element ED deformable under traction, and
   wherein, for any traction-deformable filamentary element ED, there is an elongation $A_{ED} < AR_{ED}$ that is such that $M1_{ED}/M2_{ED} < 1$, where $M1_{ED}$ represents a modulus of the deformable filamentary element ED for any elongation less than or equal to $K1 \times A_{ED}\%$, $M2_{ED}$ represents a modulus of the deformable filamentary element ED for any elongation greater than or equal to $K2 \times A_{ED}\%$, $AR_{ED}$ representing an elongation at break of the deformable filamentary element ED, as a %, with K1 ranging from 0.8 to 0.95 and K2 ranging from 1.05 to 1.2, the modulus values $M1_{ED}$, $M2_{ED}$ and the elongation at break $AR_{ED}$ being measured in accordance with standard ASTM D885-03.

9. The panel according to claim 1, wherein the first and second woven fabrics comprise, independently of one another, a material selected from the group consisting of a polyester, a polyamide, a polyketone, a polyurethane, a natural fiber, an inorganic fiber, a cellulose fiber and a collection thereof.

10. The panel according to claim 1, wherein at least one of the woven fabrics comprises a material that is fire-retardant either through its nature or by having a fire-retardant treatment.

11. The panel according to claim 1, wherein each filamentary element of the linking structure is a textile element.

12. The panel according to claim 11, wherein each filamentary element of the linking structure is a multifilament textile fiber, each fibril making up the multifilament textile fiber having a diameter between 0.001 and 0.5 mm.

13. The panel according to claim 1, wherein each filamentary element of the linking structure is a metallic element.

14. The panel according to claim 1, wherein the mean at-rest length $\overline{h_m}$ of the stays is greater than 8 mm.

15. An assembly comprising at least one panel according to claim 1.

* * * * *